(12) United States Patent
Ueyama et al.

(10) Patent No.: US 8,524,850 B2
(45) Date of Patent: *Sep. 3, 2013

(54) HYDROPHILIC POLYSILOXANE MACROMONOMER, AND PRODUCTION AND USE OF THE SAME

(75) Inventors: Hiroyuki Ueyama, Tokyo (JP);
Seiichiro Ikawa, Tokyo (JP); Junichi Iwata, Tokyo (JP)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,709

(22) Filed: Mar. 5, 2012

(65) Prior Publication Data

US 2012/0184698 A1    Jul. 19, 2012

Related U.S. Application Data

(63) Continuation of application No. 12/366,670, filed on Feb. 6, 2009, now Pat. No. 8,129,442.

(60) Provisional application No. 61/098,323, filed on Sep. 19, 2008.

(30) Foreign Application Priority Data

Feb. 8, 2008  (JP) ................. 2008-028642

(51) Int. Cl.
*C08G 77/46*  (2006.01)
*C08G 77/20*  (2006.01)

(52) U.S. Cl.
USPC ............. 528/32; 528/15; 528/25; 528/31; 528/37

(58) Field of Classification Search
None
See application file for complete search history.

(56) References Cited

U.S. PATENT DOCUMENTS

| | | |
|---|---|---|
| 4,136,250 A | 1/1979 | Mueller et al. |
| 4,259,467 A | 3/1981 | Keogh et al. |
| 4,260,725 A | 4/1981 | Keogh et al. |
| 4,600,751 A | 7/1986 | Lee et al. |
| 4,605,712 A | 8/1986 | Mueller et al. |
| 4,954,586 A | 9/1990 | Toyoshima et al. |
| 5,358,995 A | 10/1994 | Lai et al. |
| 5,387,632 A | 2/1995 | Lai et al. |
| 5,807,944 A | 9/1998 | Hirt et al. |
| 5,994,488 A | 11/1999 | Yokota et al. |
| 6,207,782 B1 | 3/2001 | Czech et al. |
| 6,762,264 B2 | 7/2004 | Kunzler et al. |
| 6,867,245 B2 | 3/2005 | Iwata et al. |
| 6,921,802 B2 | 7/2005 | Kunzler et al. |
| 2002/0016383 A1 | 2/2002 | Iwata et al. |
| 2003/0134968 A1 | 7/2003 | Kang et al. |
| 2004/0192872 A1 | 9/2004 | Iwata et al. |
| 2006/0063852 A1 | 3/2006 | Iwata et al. |
| 2006/0211789 A1 | 9/2006 | Iwata et al. |
| 2007/0066706 A1 | 3/2007 | Manesis et al. |
| 2007/0291223 A1 | 12/2007 | Chen et al. |
| 2007/0296914 A1 | 12/2007 | Hong et al. |

FOREIGN PATENT DOCUMENTS

| | | |
|---|---|---|
| JP | 56-94323 | 7/1981 |
| JP | 56-94324 | 7/1981 |
| JP | 62-29776 | 6/1987 |
| JP | 62-29777 | 6/1987 |
| JP | 6-032855 | 2/1994 |
| JP | 6-279560 | 10/1994 |
| JP | 8-245737 | 9/1996 |
| JP | 10-212355 | 8/1998 |
| JP | 2003-192790 | 7/2003 |
| JP | 3441024 | 8/2003 |
| JP | 2003-277506 | 10/2003 |
| JP | 3644177 | 4/2005 |
| WO | 01/44861 | 6/2001 |
| WO | 2006/026474 | 3/2006 |

OTHER PUBLICATIONS

International Search Report that issued with respect to PCT/JP2009/052019, mailed May 19, 2009.

*Primary Examiner* — Marc Zimmer
(74) *Attorney, Agent, or Firm* — Kilyk & Bowersox, P.L.L.C.

(57) ABSTRACT

PROBLEM TO BE SOLVED
To provide an ophthalmic lens, which can be more safely worn, that is, to provide a material, which is transparent and has high oxygen permeability and a high hydrophilic property, and to provide a novel monomer to be a raw material thereof.
SOLUTION
A hydrophilic polysiloxane macromonomer contains polyoxyethylene as a hydrophilic side chains in a polysiloxane main chain, wherein transparency, oxygen permeability, and hydrophilic properties of the material are controlled by regulating the length of the polysiloxane main chain, the length of the hydrophilic polyoxyethylene side chains, and the number of the side chains.

11 Claims, 2 Drawing Sheets

US 8,524,850 B2

HYDROPHILIC POLYSILOXANE MACROMONOMER, AND PRODUCTION AND USE OF THE SAME

This application is a continuation of U.S. patent application Ser. No. 12/366,670, filed Feb. 6, 2009, which, in turn, claims priority from Japanese Patent Application No. 2008-028642, filed Feb. 8, 2008, and U.S. Provisional Patent Application No. 61/098,323, filed Sep. 19, 2008, and are incorporated in their entirety by reference herein.

TECHNICAL FIELD

The present invention relates to a novel hydrophilic polysiloxane macromonomers, a method of production thereof, and to an ophthalmic lens employing the hydrophilic polysiloxane macromonomer and, in particular, to a contact lens. In more detail, the present invention relates to a contact lens having both oxygen permeability and hydrophilicity, and a raw material therefor.

BACKGROUND ART

An ophthalmic lens, in particular, a contact lens, must be supplied with oxygen from air, the oxygen being needed for maintaining corneal health condition, and thus, high oxygen permeability is required. In recent years, a contact lens has been developed which uses siloxane monomers as raw materials to improve oxygen permeability.

High hydrophilicity, in addition to oxygen permeability, is required for a contact lens. A contact lens with high hydrophilicity is generally said to provide good wearing feel and to be wearable for an extended period of time with comfort. Hydrophilic monomers are generally used as raw materials in order to improve hydrophilicity of a contact lens.

To produce a contact lens having both high oxygen permeability and high hydrophilicity, both a siloxane monomer and a hydrophilic monomer are required as raw materials; however, since a siloxane monomer has high hydrophobicity in general and thus has poor miscibility with a hydrophilic monomer, a phase separation occurs, thereby making it difficult to produce a transparent contact lens. In order to solve this problem, hydrophilized siloxane monomers have been developed.

For example, Patent Documents 1 and 2 disclose hydrophilic contact lenses produced from polysiloxane containing hydrophilic side chains, wherein compounds containing polyether groups, hydroxyl groups, amide groups, and quaternary amine groups and the like are selected for the hydrophilic side chains; however, since the specifically disclosed polysiloxane contains comparatively many hydrophilic side chains per each molecule, each chain having a comparatively low molecular weight, the hydrophilicity and oxygen permeability are not adequately balanced, making it difficult to use said polysiloxane as a raw material for an ophthalmic lens with high oxygen permeability and high hydrophilicity.

Patent Document 3 discloses a molded plastic article formed from a polymerized component containing, as the hydrophilic side chains, a group having a polymerizable double bond, a hydroxyl group, an organosiloxane group, and an amide group. The polymerized component is said to make it possible to produce the molded plastic article with high transparency, high oxygen permeability, good water wettability, and good mechanical properties. However, the specifically disclosed compound has a short chain of siloxane, and thus, effective oxygen permeability cannot be obtained, and the compound has only one polymerizable functional group per each molecule, thereby making it difficult to obtain adequate strength.

Patent Documents 4, 5 and 6 disclose a hydrogel soft contact lens formed from a hydrophilic siloxane monomer and a copolymer thereof, in which the hydrophilic siloxane monomer contains a main chain obtained by linking polymerizable groups and polysiloxane chains by urethane or urea groups, where it contains as side chains fluorine-substituted hydrocarbon groups and polyoxyalkylene groups. Hydrophilic siloxane monomers containing urethane or urea groups have high intermolecular forces, making its copolymers also prone to have a comparatively high modulus of elasticity and leading to a loss in some cases of the flexibility which greatly influences the wearing feel of contact lenses.

[Patent Document 1] Japanese Patent Publication No. 62-29776
[Patent Document 2] Japanese Patent Publication No. 62-29777
[Patent Document 3] Japanese Patent No. 3,644,177
[Patent Document 4] International Publication WO 01/044861
[Patent Document 5] International Publication WO 2006/026474
[Patent Document 6] Japanese Patent No. 3,441,024

DISCLOSURE OF INVENTION

Problems to be Solved by the Invention

The present invention addresses problems in providing an ophthalmic lens, in particular, a contact lens, which has both oxygen permeability and hydrophilicity; and in providing a novel hydrophilic polysiloxane macromonomer, which can be used as a raw material thereof, and a method of production of the macromonomer.

Means for Solving Problems

As a result of extensive research, it was found effective to use as a raw material a hydrophilic polysiloxane macromonomer containing a polysiloxane main chain including, as hydrophilic side chains, polyoxyethylenes when both high oxygen permeability and high hydrophilicity are to be obtained in an ophthalmic lens, in particular, a contact lens, and in addition, oxygen permeability and hydrophilicity were found to be greatly influenced by the length of the polysiloxane main chain, the length of the hydrophilic polyoxyethylene side chains and the number of the side chains, leading to the present invention. It was also found that a hydrophilic polysiloxane macromonomer, in which both terminals of the main chain have polymerizable functional groups and the polymerizable functional groups and polysiloxane of the main chain are linked by ester groups, was effective for properly controlling the strength and modulus of elasticity, which greatly influence the ease of use and wearing feel of a contact lens.

Specifically, an example may be found in a hydrophilic polysiloxane macromonomer represented by a general formula (1):

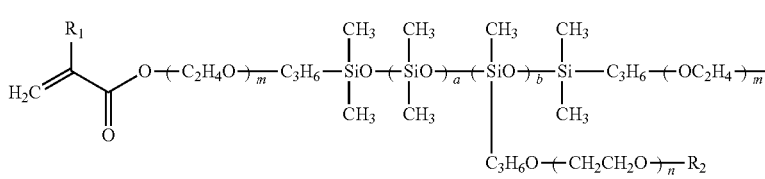
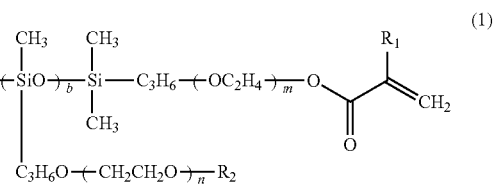

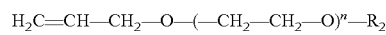

wherein R1 is either a hydrogen or a methyl group; R2 is either a hydrogen or a $C_{1-4}$ hydrocarbon group; m is an integer of 0 to 10; n is an integer of 4 to 100; a and b are integers of 1 or more; a+b is equal to 20-500; b/(a+b) is equal to 0.01-0.22; and the sequence of siloxane units includes a random sequence.

It is to be noted that "the sequence of siloxane units includes a random sequence" means that the siloxane units which contain polyoxyethylene as hydrophilic side chains and the siloxane units which do not contain the polyoxyethylene side chains may be arranged randomly or in block form, or random arrangement and block form arrangement may coexist in one molecule. Also, the ratio of random sequence and block sequence may be optional, and, for example, only a random sequence or block sequence may be included in one molecule, or the random and block sequences may be included at an optional ratio.

The present invention also relates to a hydrophilic polysiloxane macromonomer, in which a and b in the general formula (1) are 25-200 and 2-20, respectively; to a hydrophilic polysiloxane macromonomers, in which n in the general formula (1) is 5-20; and to a hydrophilic polysiloxane macromonomer, in which a and b in the general formula (1) are 25-160 and 3-10, respectively, and n is 5-15.

Furthermore, the present invention relates also to a method of producing a hydrophilic polysiloxane macromonomer represented by general formula (1), which is characterized by that a polysiloxane represented by general formula (2) is used as an intermediate:

with a polyethylene glycol allyl ether represented by general formula (3):

$$H_2C=CH-CH_2-O-(-CH_2-CH_2-O)^n-R_2$$

wherein R2 is selected from either a hydrogen or a $C_{1-4}$ hydrocarbon group; and n is an integer of from 4 to 100.

The hydrosilylation reaction may use, as a catalyst therefor, a platinum-containing catalyst, and the reaction step may further comprise a step of washing the hydrophilic polysiloxane macromonomer with a solvent after the reaction.

Furthermore, the present invention relates also to a homopolymer of the above-mentioned hydrophilic polysiloxane macromonomers, or to a copolymer obtained by copolymerizing the above-mentioned hydrophilic polysiloxane macromonomer with one or more polymerizable monomers, and to an ophthalmic lens material employing these polymers, and to an ophthalmic lens and a contact lens employing these materials.

Effect of Invention

The hydrophilic polysiloxane macromonomer of the present invention has good miscibility with polymerizable mixtures containing a hydrophilic monomer, and thus, a transparent copolymer can be obtained, and high oxygen permeability can be also maintained. By using these characteristics, it is useful as an ophthalmic lens material with high hydrophilicity and high oxygen permeability. It is to be noted that ophthalmic lenses, not being limited in particular, are

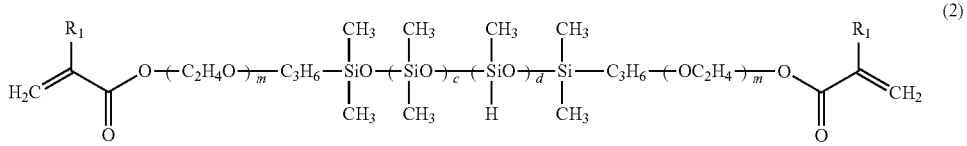

wherein R1 is selected from either hydrogen or a methyl group; m represents an integer of from 0 to 10; c and d represent integers of 1 or more; c+d is 20-500; d/(c+d) is 0.01-0.22; and the sequence of siloxane units includes a random sequence.

In more detail, the present invention relates also to a method in which the step of producing the polysiloxane intermediate represented by general formula (2) is carried out by using an acid catalyst by ring-opening polymerization of a cyclic dimethylsiloxane, a cyclic siloxane having hydrosilane (Si—H), and a siloxane having (meth) acrylic groups at both ends, followed by stopping the ring-opening polymerization by neutralizing the reaction with a basic aqueous solution.

The present invention relates also to obtaining the hydrophilic polysiloxane macromonomer represented by general formula (1) by a production method in which the intermediate represented by general formula (2) is reacted by hydrolysis preferably understood to be lenses fitted to the anterior eye segment for purposes such as vision correction, test and therapy, and preferably include, an intraocular lens, a corneal lens, and a contact lens, for example.

BEST MODE FOR CARRYING OUT THE INVENTION

Figure 1:
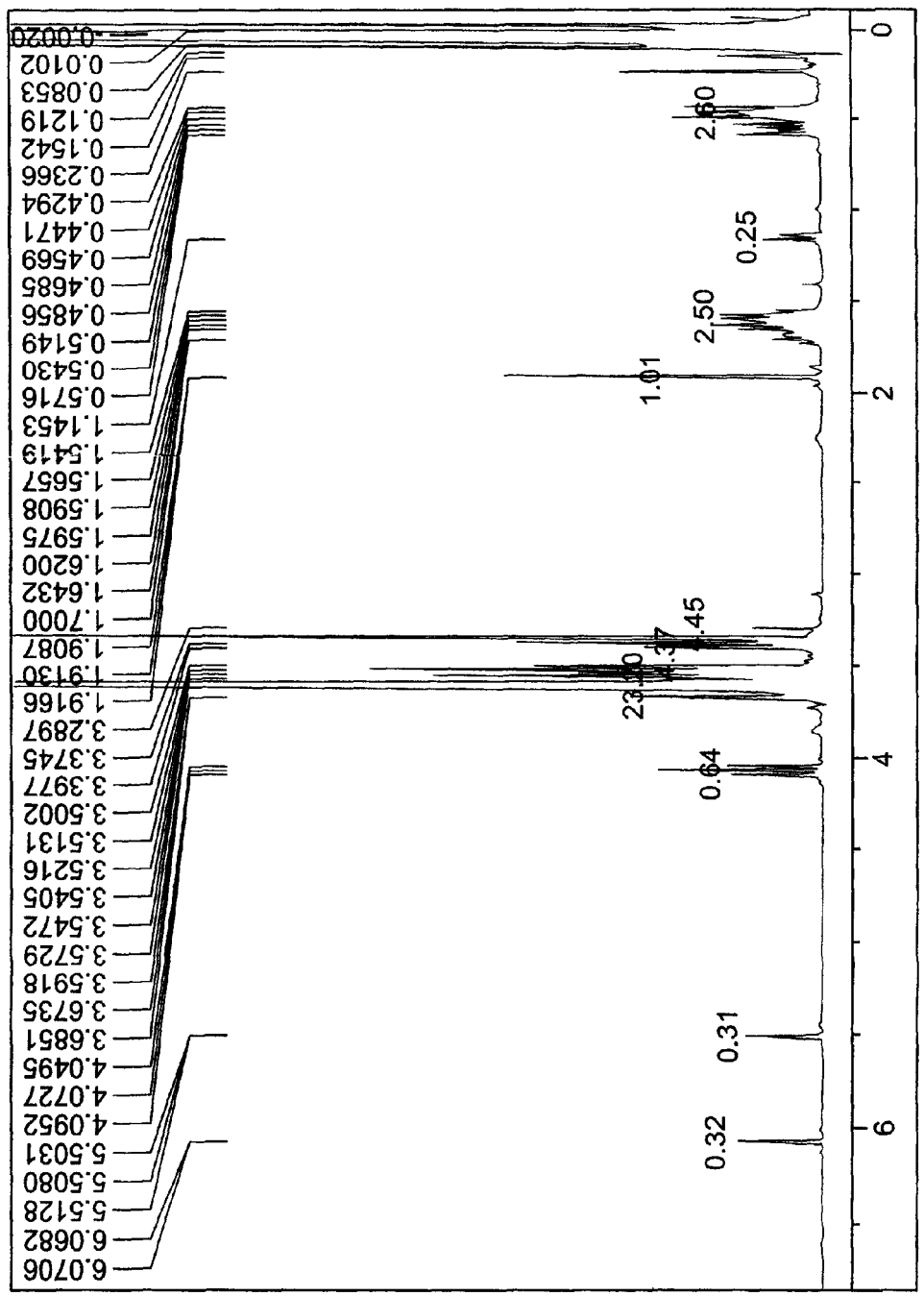
FIG. 1 is a $^1$H-NMR chart of a hydrophilic polysiloxane macromonomer A.

The present invention is specifically described below.

In the aforementioned general formula (1), which is the raw material of an ophthalmic lens, in particular, a contact lends, with both high oxygen permeability and high hydrophilicity a+b, which determines the length of a polysiloxane main chain, b/(a+b), which determines the content of hydrophilic side chains, and the number n of links of polyoxyethylenes, which are the hydrophilic side chains, is important, wherein a+b is 20-500, b/(a+b) is 0.01-0.22, and n is 4-100; preferably a+b is 27-220, b/(a+b) is 0.01-0.15, and n is 5-20; more preferably, a+b is 28-160, b/(a+b) is 0.01-0.10, and n is 5-15. Furthermore, a and b per each hydrophilic polysiloxane macromonomer molecule are preferably 25-200 and 2-20, respectively; more preferably, 25-160 and 3-10, respectively.

Various methods of synthesizing a hydrophilic polysiloxane macromonomer disclosed in the present invention are conceivable and they may include, for example, a method as described below, which is via a polysiloxane intermediate represented by the general formula (2) shown below.

Specifically, ring-opening polymerization of a mixture of cyclic dimethylsiloxane, cyclic siloxane having hydrosilane (Si—H), and disilane having (meth)acrylic groups at both terminals is carried out using an acid catalyst, such as sulfuric acid, trifluoromethanesulfonic acid or acid clay, thereby to provide a polysiloxane intermediate containing (meth)acrylic groups at both terminals as shown in the general formula (2):

H), and a siloxane having (meth) acrylic groups at both ends by using an acid catalyst such as sulfuric acid, trifluoromethanesulfonic acid or acid clay, preferably trifluoromethanesulfonic acid having a high acidity and a high catalytic activity, the reaction can be stopped by adding a basic aqueous solution. The basic aqueous solution preferably has a pH of more than 7 but 14 or less, more preferably a weak basic pH of more than 7 but 9 or less which range makes the side reaction unlikely to occur.

As for the reaction solvent, although the reaction may be carried out without using any solvent used in the reaction, a solvent that does not inhibit the ring-opening polymerization by the acid catalyst may be used. Examples of the reaction solvents include tetrahydrofuran, dioxan, hexane, cyclohexane, heptane, cycloheptane, chloroform, dichloromethane, dichloroethane, dimethoxyethane, toluene, benzene, xylene, diethyl ether, diisopropyl ether, acetone, and methyl ethyl ketone. Among them, a solvent which does not include any hetero element, such as oxygen and nitrogen, which suppresses the activity of the acid catalyst, is preferred.

The reaction temperature may be in the range of 0-150° C., preferably 20-100° C., more preferably 25-80° C. The higher reaction temperature results in an acceleration of the reaction,

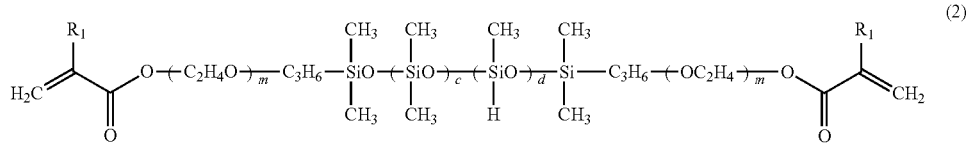

(2)

wherein R1 is selected from either a hydrogen or a methyl group; is an integer of 0 to 10; c and d are integers of 1 or more; c+d is 20-500; d/(c+d) is 0.01-0.22; and the sequence of siloxane units includes a random sequence.

In the general formula (2), the ratio and total number of c and d may be optionally controlled by varying the compounding ratio of cyclic dimethylsiloxane, cyclic siloxane having hydrosilane (Si—H), and disilane having (meth)acrylic groups at both terminals. The polysiloxane intermediate obtained in this manner does not have a single molecular weight but has a molecular weight distribution as in the case of a typical synthetic polymer.

A synthesis method is described below in more detail. After ring-opening polymerization of a mixture of a cyclic dimethylsiloxane, a cyclic siloxane having hydrosilane (Si— but it may entail an occurrence of a side reaction due to polymerization of (meth) acrylic groups, for example.

A polymerization inhibitor, such as HQ (hydroquinone), BHT (2,6-di-t-butyl-4-methylphenol) and MQ (p-methoxyphenol), may be previously added into a reaction system to inhibit a side reaction due to radical polymerization of (meth) acrylic groups and the like during the ring-opening polymerization.

One example of the method of producing the polysiloxane intermediate represented by the aforementioned general formula (2) includes a method comprising a step of synthesizing a compound represented by general formula (6) as an intermediate, as shown in the following reaction formula (b):

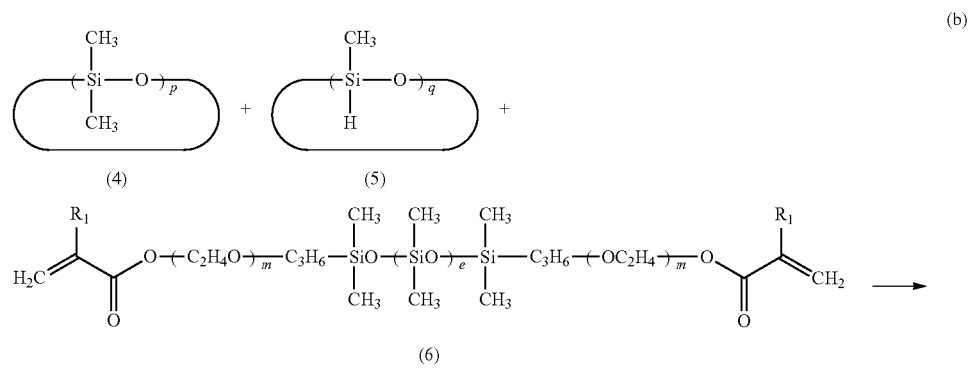

(b)

(6)

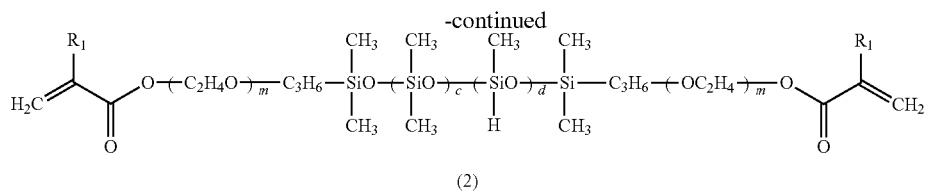

(2)

wherein R1 is selected from either a hydrogen or a methyl group; m is an integer of from 0 to 10; p and q are integers of from 3 to 10, preferably from 3 to 5; c and d are integers of 1 or more; c+d is 20-500; d/(c+d) is 0.01-0.22; e is an integer of from 0 to 500; and the sequence of siloxane units includes a random sequence.

followed by causing the block copolymer (7) obtained in the above-mentioned reaction to be reacted with a (meth)acrylic acid represented by general formula (8) or a reactive derivative thereof thereby to synthesize a siloxane having (meth) acrylic groups at both ends and being represented by general formula (6) by the following reaction formula (d):

(c)

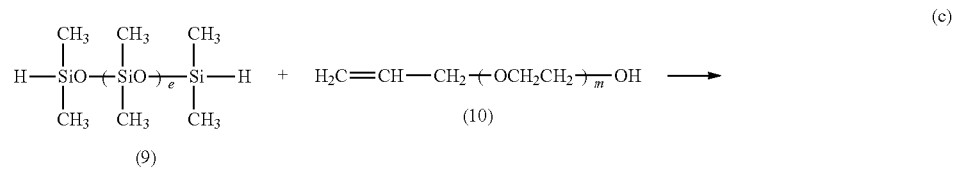

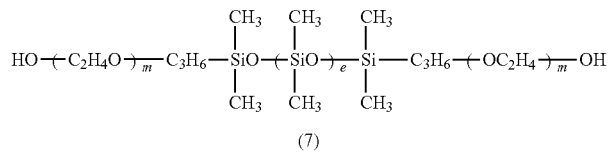

(d)

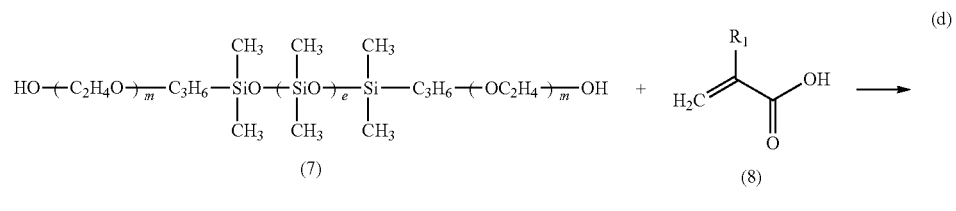

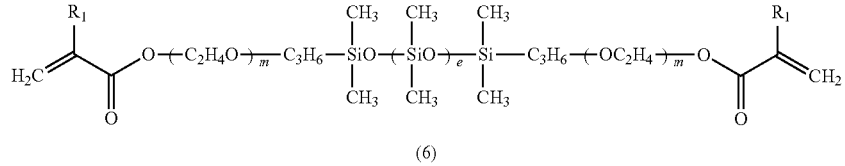

(6)

As for the siloxane having (meth)acrylic groups at both ends and being represented by general formula (6), a compound commercially available under the name of TSL9706 (manufactured by Momentive) may be used, but it may also be synthesized by the following method, for example.

The first example of the method of synthesizing a siloxane of general formula (6) is shown as the reaction formulae (c) and (d) described below. In other words, the example is a method in which a siloxane having SiH groups at both ends and being represented by general formula (9) is hydrosilated with a polyoxyalkylene having a hydroxyl group at one end and an allyl group represented by general formula (10) thereby to generate a polyoxyalkylene-polysiloxane block copolymer with hydroxyl groups at both ends and being represented by general formula (7) by the reaction formula (c), wherein R1 is selected from either a hydrogen or a methyl group; m is an integer of from 0 to 10; and e is an integer of from 0 to 500.

Another example of the method of synthesizing a siloxane of general formula (6) is the reaction formulae (e) and (f) as described below. In other words, the other example is a method in which a polyoxyalkylene having a hydroxyl group at one end and an allyl group and being represented by general formula (10) is reacted with a (meth)acrylic acid represented by general formula (8) or a reactive derivative thereof thereby to generate a polyoxyalkylene having an allyl group at one end and a (meth)acrylic group represented by general formula (11) by reaction formula (e), followed by causing the (11) obtained in the above-mentioned reaction to be reacted with a siloxane having SiH groups at both ends and being represented by general formula (9) thereby to synthesize a siloxane having (meth)acrylic groups at both ends and being represented by general formula (6) by the following reaction formula (f):

may be used. Examples may include isopropanol, tetrahydrofuran, dioxan, hexane, cyclohexane, heptane, cycloheptane, chloroform, dichloromethane, dichloroethane, dimethoxy-

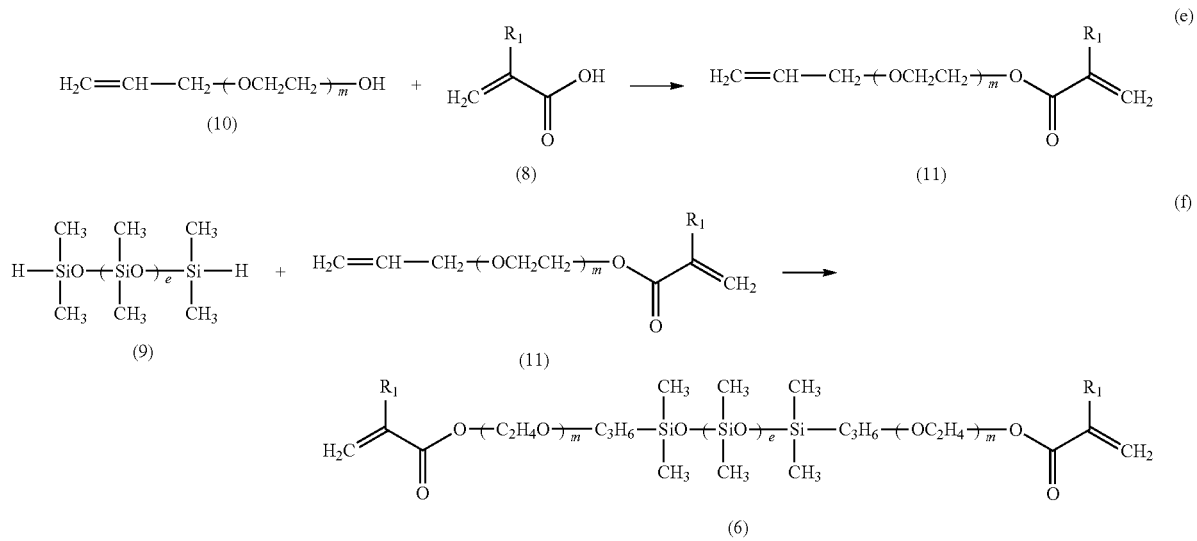

wherein R1 is selected from either hydrogen or a methyl group; m represents an integer of from 0 to 10; and e represents an integer of from 0 to 500.

Next, a hydrophilic polysiloxane macromonomer may be obtained by using so-called hydrosilylation reaction, in which polyethylene glycol allyl ether is added to the intermediate represented by general formula (2) using a transition metal catalyst such as chloroplatinic acid. The hydrophilic polysiloxane macromonomer, likewise the polysiloxane intermediate thereof, also becomes a compound having a molecular weight distribution.

As for the polyethylene glycol allyl ether, various compounds may be used, and among them, a compound represented by the following general formula (3) is preferable, where R2 is selected from either a hydrogen or a $C_{1-4}$ hydrocarbon group; n is an integer of from 4 to 100, particularly preferably 5 to 20, further preferably 5 to 15; and R2 is preferably a hydrogen or a methyl group.

In addition, when carrying out the reaction, it is important to add a larger amount of polyethylene glycol allyl ether than the amount required to keep the system at a stoichiometric ratio, whereby the side reaction due to an unreacted SiH group, such as hydrolysis, is suppressed, thereby enabling to obtain a macromonomer of stable quality. In addition, surplus polyethylene glycol allyl ether can be easily removed, after the reaction, by a purification method with a solvent described below.

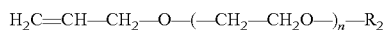

As for the transition metal catalyst to be used in the hydrosilylation reaction, examples may include ruthenium, rhodium, iridium, osmium, and platinum; preferably a platinum-containing catalyst; more preferably hexachloroplatinic acid, 1,3-divinyltetramethyldisiloxane platinum complex, platinum carried on activated carbon, and platinum(IV) oxide; most preferably a hexachloroplatinic acid exhibiting a high catalytic activity.

As for the reaction solvent, a solvent that does not suppress the hydrosilylation reaction and that does not react by itself ethane, benzene, toluene, and xylene. In particular, when reacting a polyethylene glycol allyl ether of general formula (3) in which R2 is a hydrogen, a method of protecting a hydroxyl group to suppress the side reaction between hydroxyl and SiH groups may be used, but a method of adding a buffer agent is particularly easily and more preferably used. For example, a potassium acetate is particularly useful.

The reaction temperature may be in the range of 0-150° C., preferably 25-100° C., more preferably 35-85° C. The higher reaction temperature results in an acceleration of the reaction, but it may entail an occurrence of a side reaction due to polymerization of a (meth) acrylic group, for example.

A washing operation with a solvent may be performed as the purification method after the hydrosilylation reaction. A hydrophilic polysiloxane macromonomer of interest can be precipitated and separated by dissolving a crude product in a first solvent, followed by adding a second solvent. The first solvent referred to herein is a solvent in which the macromonomer represented by general formula (1) is easily dissolved, and the second solvent is a solvent in which the macromonomer represented by general formula (1) is difficult to be dissolved and polyethylene glycol allyl ether used is dissolved.

Examples of the first solvent include methanol, ethanol, propanol, isopropanol, butanol, isobutanol, acetone, tetrahydrofuran, dioxan, chloroform, dichloromethane, dichloroethane, and ethylene glycol. Examples of the second solvent include water.

A macromonomer of interest can be obtained by removing the solvent by distillation after purification, but an appropriate amount of polymerization inhibitor, such as HQ (hydroquinone), BHT (2,6-di-t-butyl-4-methylphenol) and MQ (p-methoxyphenol), may be also previously added in order to prevent gelation in the process.

In addition to the production method via the intermediate represented by general formula (2), there is also a method of producing the hydrophilic polysiloxane macromonomer by producing a polyoxyalkylene group-containing intermediate having reactive groups such as hydroxyl groups at both ends, followed by introducing a polymerizable group such as a (meth)acrylic group. However, since this method has a difficult purification process and the process becomes long, the production method via the intermediate represented by general formula (2), as disclosed herein, is industrially useful and preferable.

Also, the present invention discloses a polymer of hydrophilic polysiloxane macromonomer alone, represented by the general formula (1), or a copolymer obtained by copolymerizing with one or more polymerizable monomers, and in particular an ophthalmic lens material. The ophthalmic lens to which the present invention is applicable include an intraocular lens and a corneal lens, and further preferably, contact lenses.

A copolymerizable monomer will now be described below. Any monomer may be used in the present invention as long as it is copolymerizable, and in particular, hydrophilic monomers are useful. That is because the hydrophilic monomers may be used as monomers that improve the surface hydrophilic properties of hydrophilic polysiloxane macromonomer copolymers and change water content of the copolymer. Examples of copolymerizable monomers include a hydroxyl group-containing monomer such as 2-hydroxyethyl methacrylate, 2-hydroxypropyl methacrylate, 2-hydroxybutyl acrylate, 4-hydroxybutyl acrylate or glycerol methacrylate; a hydroxyl group-containing monomer having a fluorine-containing substituent such as 3-(1,1,2,2-tetrafluoroethoxy)-2-hydroxypropyl methacrylate; a carboxylic acid group-containing monomer such as methacrylic acid, acrylic acid, itaconic acid, fumaric acid or maleic acid; an alkyl-substituted amino group-containing monomer such as dimethylaminoethyl methacrylate or diethylaminoethyl methacrylate; an amide group-containing monomer such as N,N-dimethylacrylamide, N,N-diethylacrylamide, N-methylacrylamide, methylenebisacrylamide, diacetone acrylamide, N-vinyl pyrrolidone or N-vinyl-N-methylacetamide; and an oxyalkylene group-containing monomer such as methoxy polyethylene glycol monomethacrylate or polypropylene glycol monoacrylate.

An example of other usable monomers is a fluorine-containing monomer such as acrylic acid fluoroalkyl ester or methacrylic acid fluoroalkyl ester, including, e.g., trifluoroethyl acrylate, tetrafluoroethyl acrylate, tetrafluoropropyl acrylate, pentafluoropropyl acrylate, hexafluorobutyl acrylate, hexafluoroisopropyl acrylate and methacrylates corresponding to these acrylates, which may be selected depending on needed miscibility, hydrophilic property, water content and resistance to staining.

Furthermore, to improve the oxygen permeability, various monomers containing a siloxane may be selected, such as tris(trimethylsiloxy)silylpropyl methacrylate, [alpha]-butyl-[omega]-{3-[2-(2-methacryloxyethylcarbamoyloxy)ethoxy]propyl}polydimethylsiloxane, a siloxane-containing macromonomer described in Examples A-1, B-1, C-1 and D-1 of Japanese Patent Publication No. H11-502949, a siloxane-containing monomer (V2D25) described in U.S. Pat. No. 5,260,000, a siloxane-containing macromonomer described in Example 1 in Japanese Patent Publication No. 2003-528183, a siloxane-containing macromonomer (A1, A2) in International Publication WO2004/063795, and a siloxane-containing macromonomer described in Example 1 of Japanese Patent Publication No. 2001-311917.

An alkyl acrylate ester monomer, an alkyl methacrylate ester monomer and the like may be also used as needed. Examples include methyl acrylate, ethyl acrylate, n-propyl acrylate, n-butyl acrylate, cyclopentyl acrylate, n-stearyl acrylate, and methacrylates corresponding to these acrylates.

Monomers described below may be optionally copolymerized to improve mechanical properties, dimensional stability and the like. Examples of monomers to improve the mechanical properties include monomers affording high glass transition point polymers, which are aromatic vinyl compounds such as styrene, tert-butylstyrene, [alpha]-methylstyrene, and t-butyl methacrylate, cyclohexyl methacrylate, and isobornyl methacrylate.

Crosslinkable monomers are particularly useful in further improving dimensional stability. Examples include ethylene glycol dimethacrylate, diethylene glycol dimethacrylate, triethylene glycol dimethacrylate, polyethylene glycol dimethacrylate, trimethylolpropane trimethacrylate, pentaerythritol tetramethacrylate, bisphenol A dimethacrylate, vinyl methacrylate, allyl methacrylate and acrylates corresponding to these methacrylates; triallyl isocyanurate; divinylbenzene; and N,N'-methylene bisacrylamide. One or a combination of two or more of these monomers may be used.

The properties of copolymers can be controlled by varying the compounding ratios of the copolymerizable monomers, but the ratios of a hydrophilic polysiloxane macromonomer, a hydrophilic monomer and another monomer are preferably 10-90%, 10-80% and 0-80%, respectively, more preferably 30-80%, 10-60% and 0-30%, respectively, most preferably, 30-70%, 20-50% and 5-20%, respectively, to afford effective properties for an ophthalmic lens material.

Furthermore, various additives may be added before or after polymerization, as the case may be. Examples of additives include various coloring agents, UV absorbents, anti-oxidizing agents, surfactants, and agents for miscibility. A hydrophilic polymer, such as polyvinyl pyrrolidone according to the aforementioned Japanese PCT National Publication No. 2003-528183, may be also added to improve the wettability.

As for the method of copolymerization, radical polymerization, cationic polymerization, anionic polymerization, and addition polymerization may be used. Among them, a radical polymerization method of making a photoinitiator present in a monomeric mixture to be irradiated with ultraviolet light to perform polymerization or a radical polymerization method of performing polymerization using an azo compound or organic peroxide by heating preferred. Examples of photoinitiators used include benzoinethylether, benzyldimethylketal, [alpha], [alpha]'-diethoxyacetophenone, and 2,4,6-trimethylbenzoyldiphenylphosphineoxide. Examples of organic peroxides used include benzoyl peroxide and t-butyl peroxide. Examples of azo compounds used include azobisisobutyronitrile and azobisdimethylvaleronitrile.

A cross-linking polymer used as the ophthalmic lens material of the present invention may be formed into a contact lens or the like by a cast polymerization method in which a mold is filled with a mixture comprising a hydrophilic polysiloxane monomer, a copolymerization monomer and an initiator to perform radical polymerization by a well-known method, by a method in which polymerization is performed after loading a monomer mixture in a rotating half mold, or by a method in which the copolymer is cold-cut at a low temperature.

Thus formed lens may be also modified optionally by further subjecting its surface to, for example, plasma treatment, ozone treatment, graft polymerization or plasma polymerization.

EXAMPLES

Example 1

9.7 g of 1,3-bis(3-methacryloxypropyl)-1,1,3,3-tetramethyldisiloxane (TSL9706, Momentive), 139 g of octamethylcyclotetrasiloxane (LS8620, Shin-Etsu Chemical), and 7.5 g of 1,3,5,7-tetramethylcyclotetrasiloxane (LS8600, Shin-Etsu Chemical) were dissolved in 170 g of chloroform, and trifluoromethanesulfonic acid (Wako Pure Chemical Industries) was further added, and thereafter this mixture was stirred at 35° C. After 24 hours, 170 g of a 0.5% aqueous sodium hydrogen carbonate solution was added to stop the reaction. After washing five times the reaction solution with 170 g of pure water, the reaction solvent was removed by distillation under a reduced pressure to obtain 140 g of residue. After washing four times the residue with 28 g of acetone and 140 g of methanol, the cleaning liquid was removed by distillation under a reduced pressure to obtain 100 g of an intermediate A.

Example 2

15 g of the intermediate A and 10 g of methoxy polyethylene glycol allyl ether having a molecular weight of about 400 (Uniox PKA5007, NOF Corporation) were dissolved in 30 g of isopropanol, and 0.015 g of potassium acetate and 0.003 g of chloroplatinic acid were further added to the solution, and thereafter this mixture was stirred for 2 hours at 40° C. The reaction solvent was removed by distillation under a reduced pressure, followed by washing the residue with 26 g of acetone and 6.5 g of pure water. After repeating the same washing operation for six times, the cleaning liquid was removed by distillation under a reduced pressure to obtain 13 g of a hydrophilic polysiloxane macromonomer A of interest.

The structural formula of the synthesized hydrophilic polysiloxane macromonomer is presented in general formula (12), wherein the sequence of siloxane units includes a random sequence. General formula (12) is a hydrophilic polysiloxane macromonomer represented by general formula (1) in which R1 is a methyl group.

Figure 2:
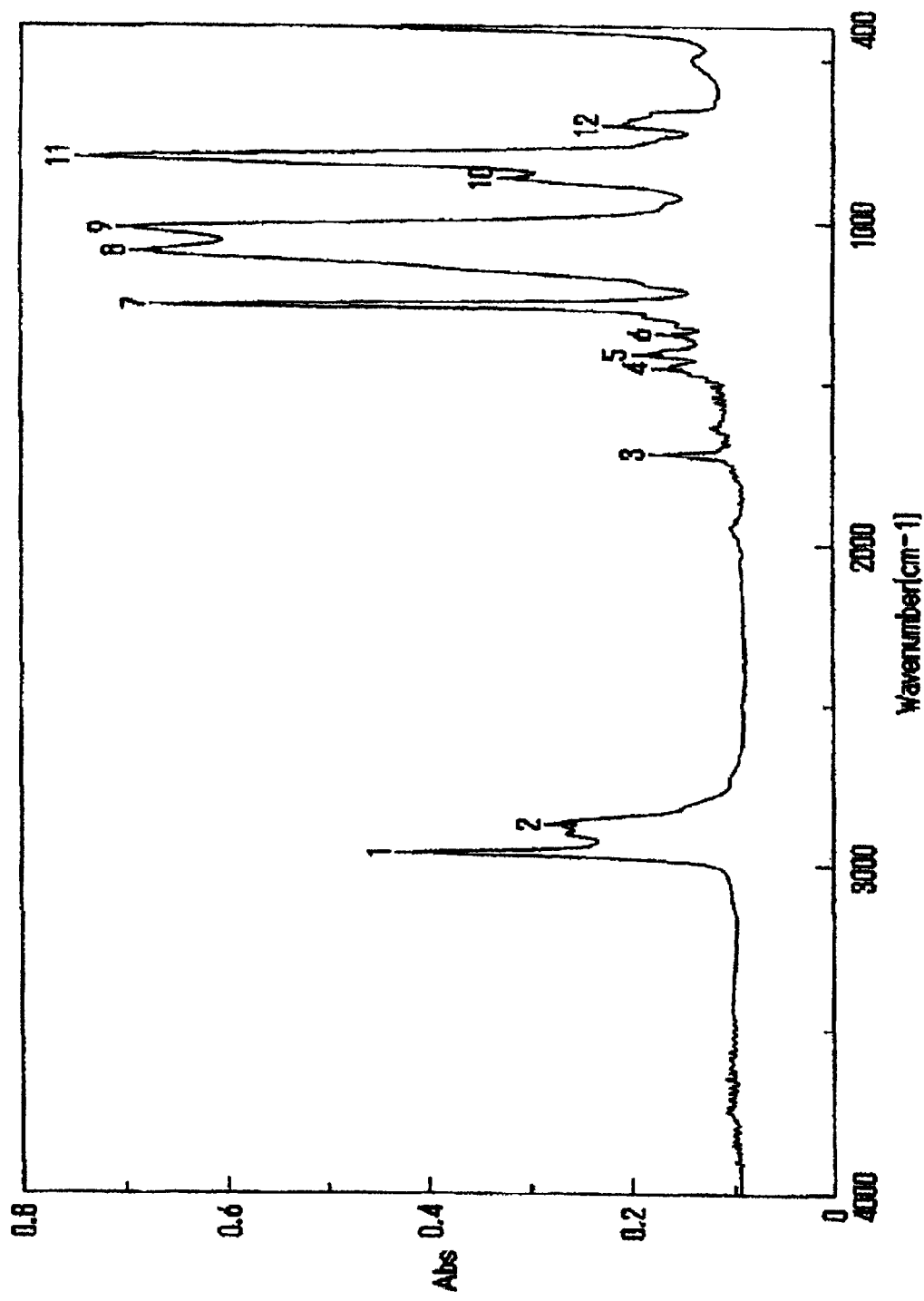
FIG. 2 is an infrared absorption chart of a hydrophilic polysiloxane macromonomer A.

A $^1$H-NMR chart of the synthesized hydrophilic polysiloxane macromonomer A is shown in FIG. 1; and its infrared absorption chart is shown in FIG. 2.

The results of analysis of $^1$H-NMR showed that, in the hydrophilic polysiloxane macromonomer A represented by the general formula (3), a=about 90, b=about 5, n=about 7, m=0, and R2 was $CH_3$.

Example 3

Synthesis and washing were carried out by the same method as in Example 2, except that methoxy polyethylene glycol allyl ether (Uniox PKA5007) used in Example 2 was substituted with 10 g of polyethylene glycol allyl ether having a molecular weight of about 400 (PKA5002, NOF Corporation), thereby to obtain 13 g of a hydrophilic polysiloxane macromonomer B of interest.

The results of analysis of $^1$H-NMR showed that, in the general formula (3), a=about 90, b=about 5, n=about 7, m=0, and R2 was a hydrogen.

Example 4

Synthesis was carried out by the same method as in Example 2, except that methoxy polyethylene glycol allyl ether used in Example 2 (Uniox PKA5007) was substituted with 10 g of Uniox PKA5010 having a molecular weight of about 1500 (NOF Corporation). After termination of the reaction, 100 g of water was added to the reaction solution, and ultrafiltration was carried out with an ultrafilter P0200 (Advantec). After purification, the solvent was removed by distillation to obtain 5 g of a hydrophilic polysiloxane macromonomer C.

The results of analysis of $^1$H-NMR showed that, in the general formula (3), a=about 90, b=about 5, n=about 35, m=0, and R2 was $CH_3$.

Example 5

Synthesis was carried out by the same method as in Example 1, except that the amount of LS8600 was changed to 15 g, to obtain 110 g of an intermediate B. Furthermore, 15 g of the intermediate B and 20 g of Uniox PKA5007 were dissolved in 30 g of isopropanol, and synthesis and washing were performed as in Example 2 to obtain 10 g of a hydrophilic polysiloxane macromonomer D of interest.

The results of analysis of $^1$H-NMR showed that, in the general formula (3), exhibit a=about 85, b=about 10, n=about 7, m=0, and R2 was $CH_3$.

Example 6

Synthesis was carried out by the same method as in Example 1, except that the amount of LS8620 was changed to 200 g, to obtain 120 g of an intermediate C. Furthermore, synthesis and washing were carried out by the same method as in Example 2, except that the intermediate A in Example 2 was substituted with 15 g of the intermediate C, to obtain 14 g of a hydrophilic polysiloxane macromonomer E of interest. The results of analysis of $^1$H-NMR showed that, in general formula (3), a=about 130, b=about 5, n=about 7, m=0, and R2 was CH3.

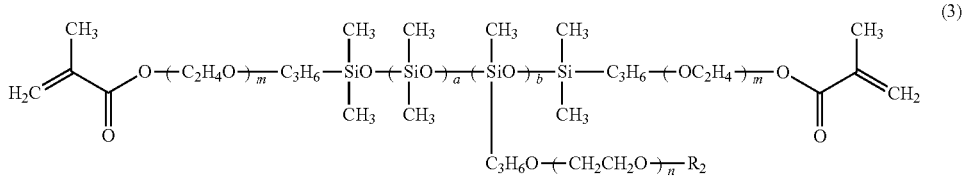

(3)

Example 7

6 g of an intermediate B in accordance with Example 5 and 12 g of polyethylene glycol allyl ether having a molecular weight of about 750 (Uniox PKA5004, NOF Corporation) were dissolved in 15 g of isopropanol, and 0.007 g of potassium acetate and 0.001 g of chloroplatinic acid were further added, and thereafter this mixture was reacted for 45 minutes at 80° C. further for 1 hour under reflux. 100 g of water was added to the reaction solution, and ultrafiltration was carried out with an ultrafilter P0200 (Advantec). After purification, the solvent was removed by distillation to obtain 3 g of a hydrophilic polysiloxane macromonomer F.

The results of analysis of $^1$H-NMR showed that, in the general formula (3), a=about 85, b=about 10, n=about 15, m=0, and R2 was a hydrogen.

Example 8

100 g of [alpha], [omega]-bis[3-(2-hydroxyethoxy)propyl] polydimethylsiloxane having a molecular weight of about 1000 (FM4411, Chisso Corporation), 32 g of methacryloyl chloride (Wako Pure Chemical Industries), and 40 g of triethylamine were dissolved in 500 g of chloroform, and this solution was stirred overnight. 100 g of methanol was added to the reaction solution, and this mixture was stirred for 2 hours, followed by removing by distillation the reaction solvent under a reduced pressure to obtain 135 g of a residue. The residue was washed five times with 100 g of methanol and 30 g of water, followed by removing by distillation the cleaning liquid under a reduced pressure to obtain 103 g of an intermediate D.

Example 9

Synthesis and washing were carried out by the same method as in Example 1, except that TSL9706 used in Example 1 was substituted with 50 g of the intermediate D, to obtain 125 g of an intermediate E. Furthermore, 15 g of the intermediate E and 10 g of Uniox PKA5007 were dissolved in 30 g of isopropanol, and synthesis and washing were performed as in Example 2 to obtain 11 g of a hydrophilic polysiloxane macromonomer G of interest.

The results of analysis of $^1$H-NMR showed that, in the general formula (3), a=about 160, b=about 4, n=about 7, m=1, and R2 was $CH_3$.

Comparative Example 1

Synthesis and washing were carried out by the same method as in Example 1, except that the amounts of TSL9706, LS8620 and LS8600 were changed to 49 g, 95 g and 0 g, respectively, to obtain 105 g of a hydrophilic polysiloxane macromonomer H of interest.

The results of analysis of $^1$H-NMR showed that, in the general formula (3), a=about 15, b=0, n=0.

Comparative Example 2

Synthesis was carried out by the same method as in Example 1, except that the amount of LS8600 was changed to 38 g, to obtain 125 g of an intermediate F. Furthermore, synthesis and washing were carried out by the same method as in Example 2, except that the intermediate A and Uniox PKA5007 in Example 2 were substituted with 15 g of the intermediate F and 13 g of allyloxy ethanol (Wako Pure Chemical Industries), respectively, to obtain 12 g of a hydrophilic polysiloxane macromonomer I of interest.

The results of analysis of $^1$H-NMR showed that, in the general formula (3), a=about 75, b=about 25, n=about 1, m=0, and R2 was a hydrogen.

Comparative Example 3

Synthesis was carried out by the same method as in Example 1, except that the amount of LS8600 was changed to 1.5 g, to obtain 98 g of an intermediate G. Furthermore, synthesis and washing were carried out by the same method as in Example 2, except that intermediate A was substituted with 15 g of intermediate G and methoxy polyethylene glycol allyl ether (Uniox PKA5007 in Example 2) was substituted with 7.5 g of Uniox PKA5010 having a molecular weight of about 1500 (NOF Corporation), to obtain 10 g of a hydrophilic polysiloxane macromonomer J of interest.

The results of analysis of $^1$H-NMR showed that, in the general formula (3), a=about 110, b=about 1, n=about 35, m=0, and R2 was $CH_3$.

Example 10

The hydrophilic polysiloxane macromonomer A synthesized in Example 2, N-methyl-N-vinylacetamide, N-vinyl pyrrolidone, isobornyl methacrylate, triallyl isocyanurate, and a polymerization initiator 2,4,6-trimethylbenzoyldiphenylphosphine oxide were mixed and stirred at a weight ratio of 66:18-10:6:0.1:0.1. This mixed solution was put in a mold for a contact lens, made of Soarlite S (The Nippon Synthetic Chemical Industry Co., Ltd.) comprising ethylene vinyl alcohol resin, and was irradiated with ultraviolet light in a photoirradiation device for 1 hour to obtain a lenticular polymer. This polymer was immersed overnight in ethyl alcohol and then immersed in water all day long. This lens was transferred into a physiological saline solution (ISO 18369-3:2006) and then sterilized in an autoclave to provide a contact lens A. The contact lens A was transparent and flexible, and also had good water wettability.

Evaluation of the properties showed that the water content was 37%, the contact angle was 41° C., the oxygen permeability coefficient (Dk) was 130, and the tensile strength was 1.5 MPa.

It is to be noted that each property was evaluated by the following method:
(1) Optical Transparency
By visual observation.
Good(○): no cloudiness, good transparency
Average(Δ) cloudiness, semitransparency
Poor(×): clouded, no transparency
(2) Water Wettability
Water wettability with respect to a physiological saline solution was evaluated by visual observation. A lens immersed in a physiological saline solution for 24 hours or longer was vertically raised from the physiological saline solution.
Good(○): A water film was held on more than half of the lens surface for not loss than 5 seconds.
Average(Δ): 1 to 5 seconds.
Poor(×): <1 second.
(3) Water Content
The lens was placed in a physiological saline solution at 37° C. for 72 hours, and then taken out, and water on the surface was wiped off to weigh the lens. The lens was then dried under vacuum at 60° C. up to constant weight, and the water content was determined by the following equation using a variation in the weight of the lens.

Water content(%)=(weight variation/weight prior to drying)×100

(4) Contact Angle
A contact angle measuring apparatus DropMaster 500 (Kyowa Interface Science) was used to measure a contact angle between a material surface and a water droplet at 25° C.
(5) Oxygen Permeability
Oxygen permeability was measured according to a method described in "A single-lens polarographic measurement of oxygen permeability (Dk) for hypertransmissible soft contact lenses" (Biomaterials, 28 (2007), 4331-4342). The oxygen permeability was measured in (ml·cm/cm²·sec·mmHg)×$10^{-11}$.

(6) Tensile Strength

Tensile strength was measured in a physiological saline solution of 25° C. using a tensile testing machine AGS-50B (Shimadzu Corporation). The central area (width of 3 mm) of the lens was cut out to measure its strength in breaking. The strength was measured in MPa.

Examples 11-14

The hydrophilic polysiloxane macromonomer A was substituted with hydrophilic polysiloxane macromonomers B to E, and contact lenses B to E were produced by the same method as in Example 10 to assess their physical properties. The assessment results are shown in Table 1.

Example 15

The hydrophilic polysiloxane macromonomer A synthesized in Example 2, N-methyl-N-vinylacetamide, N-vinyl pyrrolidone, hydroxybutyl methacrylate, [alpha]-butyl-[omega]-{3-[2-(2-methacryloxyethylcarbamoyloxy)ethoxy]propyl}polydimethylsiloxane, isobornyl methacrylate, triallyl isocyanurate, 2,4,6-trimethylbenzoyldiphenylphosphine oxide, and dioctyl sulfosuccinate sodium salt as an additive were mixed and stirred at a weight ratio of 44:10:30:10:10:6:0.1:0.1:0.5. This mixed liquid was put in a mold for a contact lens, made of Soarlite S (The Nippon Synthetic Chemical Industry Co., Ltd.), and was irradiated with ultraviolet light in a photoirradiation device for 1 hour to obtain a lenticular polymer. This polymer was immersed overnight in ethyl alcohol and then immersed in water all day long. This lens was transferred into a physiological saline solution (ISO 18369-3:2006) and then sterilized in an autoclave to provide a contact lens F. The contact lens F was transparent and flexible, and also showed a good water wettability.

Evaluation of the properties showed that the water content was 44%, the contact angle was 44° C., the oxygen permeability coefficient (Dk) was 115, and the tensile strength was 3.0 MPa.

Examples 16-17

The hydrophilic polysiloxane macromonomer A in Example 15 was substituted with the hydrophilic polysiloxane macromonomers F to G, and contact lenses G to H were produced by the same method as in Example 17, and their properties were assessed. The assessment results are shown in Table 1.

Example 18

The hydrophilic polysiloxane macromonomer A synthesized in Example 2, N-methyl-N-vinylacetamide, methyl methacrylate, triethylene glycol dimethacrylate, 2-hydroxy-4-acryloxyethoxybenzophenone, 2,2'-azobis(2,4-dimethylvaleronitriles), and dimethylsiloxan-ethylene oxide block copolymer (DBE712, Gelest) as an additive were mixed and stirred at a weight ratio of 35:47:17:0.2:0.9:0.5:25. Decompression and nitrogen purge of this mixed liquid were repeated twice to fully remove oxygen from the mixed liquid, followed by putting the mixed liquid in a mold for a contact lens, made of polypropylene. Furthermore, the mold was placed in a chamber for exclusive use, and nitrogen substitution was performed, followed by heating the mold for 30 minutes at 55° C., and subsequently for 60 minutes at 80° C., to obtain a lenticular polymer. This polymer was immersed overnight in ethyl alcohol and then immersed in water all day long. This lens was transferred into a physiological saline solution (ISO 18369-3:2006) and then sterilized in an autoclave to provide a contact lens I. The contact lens I was transparent and flexible, and also showed a good water wettability.

Evaluation of the properties showed that the water content was 40%, the contact angle was 42° C., the oxygen permeation coefficient (Dk) was 110, and the tensile strength was 2.5 MPa.

Comparative Examples 4-6

The hydrophilic polysiloxane macromonomer A in Example 10 was substituted with the hydrophilic polysiloxane macromonomers H to J, and contact lenses J to L were produced by the same method as in Example 10 to assess their physical properties. The assessment results are shown in Table 1.

TABLE 1

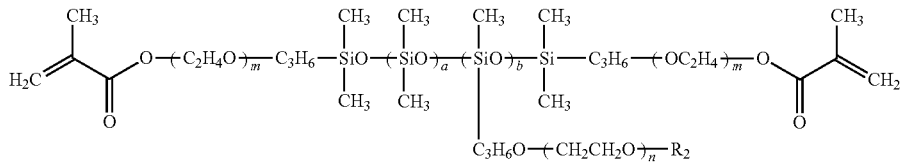

| | Example | | | | | | | | | Comparative example | | |
|---|---|---|---|---|---|---|---|---|---|---|---|---|
| | 10 | 11 | 12 | 13 | 14 | 15 | 16 | 17 | 18 | 4 | 5 | 6 |
| Contact lens | A | B | C | D | E | F | G | H | I | J | K | L |
| Hydrophilic polysiloxane macromer | A | B | C | D | E | A | F | G | A | H | I | J |
| a | ca.90 | ca.90 | ca.90 | ca.85 | ca.130 | ca.90 | ca.85 | ca.160 | ca.90 | ca.15 | ca.75 | ca.110 |
| b | ca.5 | ca.5 | ca.5 | ca.10 | ca.5 | ca.5 | ca.10 | ca.4 | ca.5 | 0 | ca.25 | ca.1 |
| n | ca.7 | ca.7 | ca.35 | ca.7 | ca.7 | ca.7 | ca.15 | ca.7 | ca.7 | 0 | ca.1 | ca.35 |
| m | 0 | 0 | 0 | 0 | 0 | 0 | 0 | 1 | 0 | 0 | 0 | 0 |
| $R_2$ | $CH_3$ | H | $CH_3$ | $CH_3$ | $CH_3$ | $CH_3$ | H | $CH_3$ | $CH_3$ | — | H | $CH_3$ |
| a + b | ca.95 | ca.95 | ca.95 | ca.95 | ca.135 | ca.95 | ca.95 | ca.164 | ca.95 | ca.15 | ca.100 | ca.111 |
| b/(a + b) | ca.0.05 | ca.0.05 | ca.0.05 | ca.0.11 | ca.0.04 | ca.0.05 | ca.0.11 | ca.0.02 | ca.0.05 | 0 | ca.0.25 | ca.0.009 |
| Transparency | good | good | good | good | good | good | good | good | good | poor | good | poor |
| Water wettability | good | good | good | good | good | good | good | good | good | poor | poor | poor |

TABLE 1-continued

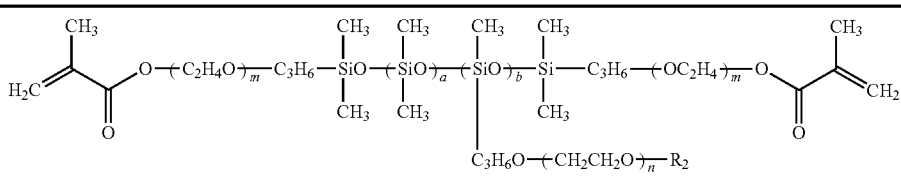

| | Example | | | | | | | | Comparative example | | |
|---|---|---|---|---|---|---|---|---|---|---|---|
| | 10 | 11 | 12 | 13 | 14 | 15 | 16 | 17 | 18 | 4 | 5 | 6 |
| Water content (%) | 37 | 38 | 55 | 45 | 32 | 44 | 55 | 30 | 40 | 11 | 45 | 21 |
| Contact angle (°) | 41 | 37 | 30 | 32 | 47 | 44 | 40 | 50 | 42 | 102 | 70 | 92 |
| Oxygen permeability[†] | 130 | 125 | 90 | 95 | 140 | 115 | 90 | 150 | 110 | 20 | 30 | 130 |
| Tensile strength (MPa) | 1.5 | 1.7 | 1.2 | 1.6 | 1.2 | 3.0 | 3.0 | 2.8 | 2.5 | 1.1 | 0.9 | 0.7 |

[†]Unit: (ml cm/cm$^2$ sec mmHg) × 10$^{-11}$
(In the formula the sequence of siloxane units includes a random sequence.)

Example 19

74.97 g of 1,3-bis(3-methacryloxypropyl)-1,1,3,3-tetramethyldisiloxane (TSL9706, Momentive), 1617.17 g of octamethylcyclotetrasiloxane (LS8620, Shin-Etsu Chemical), and 87.25 g of 1,3,5,7-tetramethylcyclotetrasiloxane (LS8600, Shin-Etsu Chemical) were dissolved in 1347.63 g of chloroform, and 10.06 g of trifluoromethanesulfonic acid (Wako Pure Chemical Industries) was further added, and this mixture was stirred at 35° C. After 18 hours, 1347.64 g of a 0.5% aqueous sodium hydrogen carbonate solution was added and stirred at room temperature for 6 hours to stop the reaction. After settled separation, the upper layer was removed, and the reaction liquid was washed with 1347 g of pure water seven times, followed by removing by distillation the reaction solvent under a reduced pressure to obtain 1603.3 g of a residue. To the residue, 320 g of acetone was added to uniformalize this mixture, and 1603 g of methanol was added to the mixture to vigorously stir this mixture, followed by centrifugation (7000 rpm, 10° C., 10 minutes) of the mixture, further followed by removing the upper layer. This operation was repeated seven times, and the solvent was removed by distillation under a reduced pressure to obtain 1105.7 g of an intermediate H.

Example 20

45.05 g of the intermediate H and 30.05 g of polyethylene glycol allyl ether having a molecular weight of about 400 (Uniox PKA5002, NOF Corporation) were dissolved in 90.45 g of isopropanol, and 0.46 g of a 10% potassium acetate/ethanol solution, 0.91 g of a 1% isopropanol solution of chloroplatinic acid and 5.9 mg of 2,6-di-t-butyl-4-methyl phenol (BHT) were further added to this mixture, and this mixture was heated to reflux for 1 hour in an oil bath at 93° C. The reaction solvent was removed by distillation under a reduced pressure, and 60 g of acetone and 30 g of pure water were added to the residue to vigorously stir this mixture, followed by centrifugation (7000 rpm, 10° C., 10 minutes) of the mixture, further followed by removing the upper layer. This operation was repeated ten times, and 3.3 mg of BHT, 2.0 mg of p-methoxyphenol (MQ) and 60 g of isopropanol were added to this mixture, and vacuum concentration of this mixture was carried out. Furthermore, 50 g of isopropanol was added to this mixture, and vacuum concentration of this mixture was carried out, and 2.2 mg of BHT and 0.8 mg of MQ were added to this mixture to obtain 55.35 g of a hydrophilic polysiloxane macromonomer K of interest.

The results of analysis of $^1$H-NMR exhibit a=about 124, b=about 7, n=about 7, m=0, and R2 representing $CH_3$ in general formula (3).

Example 21

Synthesis was carried out by the same method as in Example 20, except that the polyethylene glycol allyl ether (Uniox PKA5002, NOF Corporation) used in Example 20 was substituted with a methoxy polyethylene glycol allyl ether having a molecular weight of about 400 (Uniox PKA5007, NOF Corporation), to obtain 56.83 g of a hydrophilic polysiloxane macromonomer L of interest.

The results of analysis of $^1$H-NMR exhibit a=about 124, b=about 7, n=about 7, m=0, and R2 representing $CH_3$ in the general formula (3).

Example 22

Synthesis was carried out by the same method as in Example 19, except that the amount of LS8600 was changed to 104.7 g, to obtain an intermediate I. Furthermore, 45.13 g of the intermediate I and 36.03 g of methoxy polyethylene glycol allyl ether (Uniox PKA5007, NOF Corporation) were dissolved in 90.14 g of isopropanol, and synthesis and washing were carried out by the same method as in Example 20 to obtain 56.80 g of a hydrophilic polysiloxane macromonomer M of interest.

The results of analysis of $^1$H-NMR exhibit a=about 123, b=about 9, n=about 7, m=0, and R2 representing $CH_3$ in general formula (3).

Examples 23-25

The hydrophilic polysiloxane macromonomer A in Example 15 was substituted with the hydrophilic polysiloxane macromonomers K to M, contact lenses M to O were produced by the same method as in Example 18, respectively, and their physical properties were evaluated. The evaluation results are shown in Table 2.

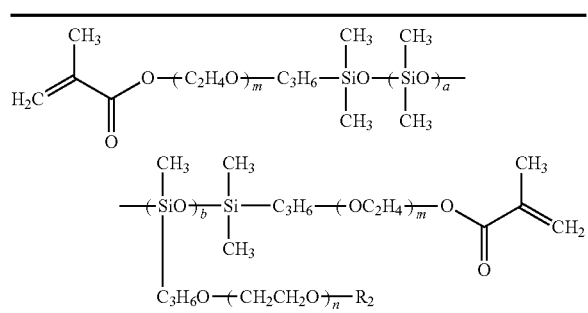

|  | Example | | |
|---|---|---|---|
|  | 23 | 24 | 25 |
| Contact lens | M | N | O |
| Hydrophilic polysiloxane macromonomer | K | L | M |
| a | ca.124 | ca.124 | ca.123 |
| b | ca.7 | ca.7 | ca.9 |
| n | ca.7 | ca.7 | ca.7 |
| m | 0 | 0 | 0 |
| $R_2$ | H | $CH_3$ | $CH_3$ |
| a + b | ca.131 | ca.131 | ca.132 |
| b/( a + b) | ca.0.05 | ca.0.05 | ca.0.07 |
| Transparency | good | good | good |
| Water wettability | good | good | good |
| Water content (%) | 48 | 46 | 49 |
| Contact angle (°) | 35 | 34 | 37 |
| Oxygen permeability[†] | 110 | 125 | 105 |
| Tensile strength (MPa) | 0.8 | 0.8 | 0.7 |

[†]Unit: (ml · cm/cm$^2$ · sec · mmHg) × 10$^{-11}$
(In the formula the sequence of siloxane units includes a random sequence.)

INDUSTRIAL APPLICABILITY

The hydrophilic polysiloxane macromonomer of the present invention has a good miscibility with the polymerizable mixtures containing the hydrophilic monomer, and thus, a transparent copolymer can be obtained. The copolymer having both high oxygen permeability and high hydrophilicity is useful as a raw material for an ophthalmic lens, more specifically, an ophthalmic lens in particular, a contact lens material with high hydrophilicity and high oxygen permeability.

The invention claimed is:

1. A macromonomer consisting of a macromonomer represented by a general formula (1):

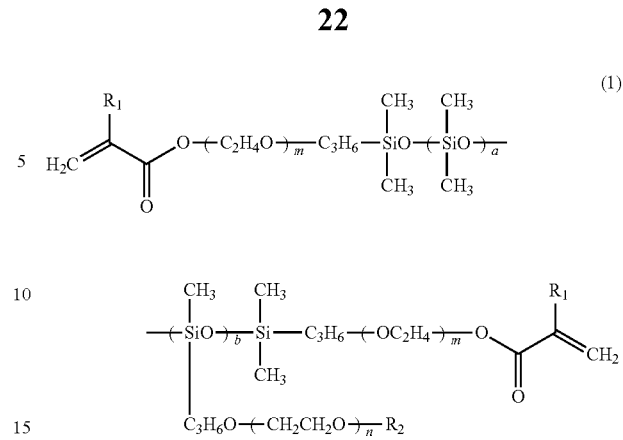

wherein $R_1$ is selected from either hydrogen or a methyl group; $R_2$ is selected from either of hydrogen or a $C_{1-4}$ hydrocarbon group; m represents an integer of from 0 to 10; n represents an integer of from 4 to 100; a and b represent integers of 1 or more; a+b is equal to 20-500; b/(a+b) is equal to 0.01-0.22; and the configuration of siloxane units includes a random configuration.

2. The macromonomer according to claim 1, wherein a and b, which are presented in the general formula (1), represent 25-200 and 2-20, respectively.

3. The macromonomer according to claim 1, wherein n presented in the general formula (1) represents 5 to 20.

4. The macromonomer according to claim 1, wherein a and b, which are presented in the general formula (1), represent 25-160 and 3-10, respectively, and n represents 5-15.

5. The macromonomer according to claim 2, wherein n presented in the general formula (1) represents 5 to 20.

6. The macromonomer of claim 1, wherein m=0.

7. A purified hydrophilic polysiloxane macromonomer useful as a raw material for an ophthalmic lens, wherein said macromonomer is represented by a general formula (1):

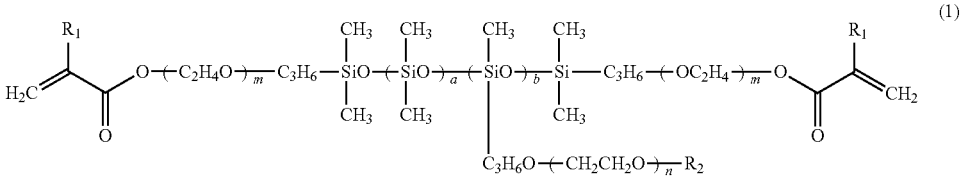

wherein $R_1$ is selected from either hydrogen or a methyl group; $R_2$ is selected from either of hydrogen or a $C_{1-4}$ hydrocarbon group; m=1; n represents an integer of from 4 to 100; a and b represent integers of 1 or more; a+b is equal to 20-500; b/(a+b) is equal to 0.01-0.22; and the configuration of siloxane units includes a random configuration, and wherein said macromonomer is capable of being polymerized to form a homopolymer.

8. The macromonomer according to claim 7, wherein a and b, which are presented in the general formula (1), represent 25-200 and 2-20, respectively.

9. The macromonomer according to claim 7, wherein n presented in the general formula (1) represents 5 to 20.

10. The macromonomer according to claim 7, wherein a and b, which are presented in the general formula (1), represent 25-160 and 3-10, respectively, and n represents 5-15.

11. The macromonomer according to claim 8, wherein n presented in the general formula (1) represents 5 to 20.

* * * * *